US009434611B2

(12) United States Patent
Sugimoto et al.

(10) Patent No.: US 9,434,611 B2
(45) Date of Patent: Sep. 6, 2016

(54) PACKAGED HYDROGEN-GENERATING AGENT, MANUFACTURING METHOD THEREFOR, AND HYDROGEN GENERATION METHOD

(75) Inventors: Masakazu Sugimoto, Kyoto (JP); Masaya Yano, Kyoto (JP)

(73) Assignee: AQUAFAIRY CORPORATION, Kyoto-shi (JP)

( * ) Notice: Subject to any disclaimer, the term of this patent is extended or adjusted under 35 U.S.C. 154(b) by 1313 days.

(21) Appl. No.: 13/265,987

(22) PCT Filed: Apr. 21, 2010

(86) PCT No.: PCT/JP2010/057040
§ 371 (c)(1),
(2), (4) Date: Oct. 24, 2011

(87) PCT Pub. No.: WO2010/123020
PCT Pub. Date: Oct. 28, 2010

(65) Prior Publication Data
US 2012/0058046 A1   Mar. 8, 2012

(30) Foreign Application Priority Data

Apr. 22, 2009   (JP) .................................. 2009-104356

(51) Int. Cl.
| *C01B 3/08* | (2006.01) |
| *C01B 3/06* | (2006.01) |
| *H01M 8/06* | (2016.01) |
| *H01M 8/04* | (2016.01) |

(52) U.S. Cl.
CPC ............... *C01B 3/065* (2013.01); *C01B 3/08* (2013.01); *H01M 8/04208* (2013.01); *H01M 8/04216* (2013.01); *H01M 8/065* (2013.01); *Y02E 60/362* (2013.01); *Y02E 60/50* (2013.01)

(58) Field of Classification Search
None
See application file for complete search history.

(56) References Cited

U.S. PATENT DOCUMENTS

| 3,674,702 | A * | 7/1972 | MacKenzie et al. ........ 149/19.9 |
| 2004/0018145 | A1 | 1/2004 | Suzuki et al. |
| 2006/0051627 | A1 * | 3/2006 | Jiang et al. ..................... 429/13 |
| 2006/0174952 | A1 | 8/2006 | Curello et al. |
| 2006/0191198 | A1 | 8/2006 | Rosenzweig et al. |
| 2006/0228293 | A1 | 10/2006 | Laurent et al. |
| 2007/0124989 | A1 | 6/2007 | Eickhoff et al. |
| 2008/0292541 | A1 | 11/2008 | Kamada et al. |
| 2009/0113795 | A1 * | 5/2009 | Eickhoff ......................... 48/116 |
| 2010/0136441 | A1 * | 6/2010 | Mori et al. .................... 429/416 |
| 2010/0223840 | A1 | 9/2010 | Rosenzweig et al. |
| 2012/0111757 | A1 * | 5/2012 | Carmichael et al. ...... 206/524.4 |

FOREIGN PATENT DOCUMENTS

| JP | 4-026501 | A | 1/1992 |
| JP | 2003-146604 | A | 5/2003 |
| JP | 2003-252601 | A | 9/2003 |
| JP | 2003-314792 | A | 11/2003 |
| JP | 2007-063029 | A | 3/2007 |
| JP | 2008-538095 | A | 10/2008 |
| JP | 2008-293964 | A | 12/2008 |
| JP | 2009 249235 | | * 10/2009 |
| JP | 4489144 | B2 | 6/2010 |
| WO | 2007/055146 | A1 | 5/2007 |
| WO | WO 2007116734 | A1 * | 10/2007 |
| WO | WO 2008090354 | A1 * | 7/2008 ............. B65D 51/24 |
| WO | 2008/132986 | A1 | 11/2008 |

OTHER PUBLICATIONS

Extended European Search Report issued Jun. 24, 2014 in corresponding EP Application No. 10767077.0.
Office Action issued Jul. 2, 2013 in corresponding Chinese Patent Application No. 201080016263.1.
Office Action issued Sep. 2, 2013 in corresponding Korean Patent Application No. 10-2011-7026848.
Office Action issued May 9, 2014 in corresponding Chinese Patent Application No. 201080016263.1.
Office Action issued May 12, 2014 in corresponding Taiwanese Patent Application No. 099134485.
International Search Report dated Jul. 14, 2010 in International Application No. PCT/JP2010/057040.
Office Action issued Nov. 27, 2014 in corresponding CN application No. 201080016263.1.
Communication Pursuant to Article 94(3) received Apr. 11, 2016 in corresponding European Application No. 10767077.0.

* cited by examiner

*Primary Examiner* — Tanisha Diggs
(74) *Attorney, Agent, or Firm* — Knobbe Martens Olson & Bear LLP

(57) ABSTRACT

Provided is a packaged hydrogen-generating agent, the hydrogen-generating reaction of which is highly stable and repeatable, and which preferably is resistant to influence from changes in the environmental temperature. Also provided are a method for manufacturing said package, and a hydrogen generation method. The packaged hydrogen-generating agent is provided with: a hydrogen-generating agent (1); a covering material (2) which encloses the hydrogen-generating agent (1) and allows deformation; and a water-absorbing body (3), part of which is in contact with the hydrogen-generating agent (1). The covering material (2) preferably covers at least the area around the contact part (3*a*) where the water-absorbing body (3) and the hydrogen-generating agent (1) are in contact, so as to create a firm attachment at the contact part (3*a*).

4 Claims, 11 Drawing Sheets

(a)

(b)

(c)

(a)

(b)

(c)

(a)

(b)

(c)

PACKAGED HYDROGEN-GENERATING AGENT, MANUFACTURING METHOD THEREFOR, AND HYDROGEN GENERATION METHOD

CROSS-REFERENCE TO RELATED APPLICATIONS

This application is the U.S. National Phase under 35. U.S.C. §371 of International Application PCT/JP2010/057040, filed Apr. 21, 2010, which claims priority to Japanese Patent Application No. 2009-104356, filed Apr. 22, 2009. The International Application was published under PCT Article 21(2) in a language other than English.

TECHNICAL FIELD

The present invention relates to a packaged hydrogen-generating agent wherein a hydrogen-generating agent that reacts with a reaction liquid such as water to generate hydrogen gas is covered with a covering member, a manufacturing method there for and a hydrogen generation method, and is particularly useful as a technique for supplying hydrogen to a fuel cell.

BACKGROUND ART

Hitherto, as a hydrogen-generating agent for generating hydrogen gas by the supply of water, known is an agent made mainly of a metal such as iron or aluminum, or an agent made mainly of a metal hydride compound such as magnesium hydride or calcium hydride (see, for example, Patent Document 1).

Patent Document 2 also discloses a hydrogen-generating agent wherein a metal hydride is enveloped in a solid-form water-soluble compound such as a water-soluble resin in order to control the rate of reaction between the metal hydride and water appropriately.

In the meantime, Patent Document 3 discloses a hydrogen-generating device in which in each of the above-mentioned holding spaces a hydrogen-generating agent is held at a filling rate making it difficult to cause a reaction liquid to enter the space by the swelling of the hydrogen-generating agent when the reaction is substantially ended. It is stated about this hydrogen-generating device that as the reaction approaches the end thereof, the entry of the reaction liquid into one of the holding spaces is made difficult by the swelling of the hydrogen-generating agent, so that the reaction liquid is supplied through a supplying path to the adjacent holding space.

PRIOR ART DOCUMENTS

Patent Documents

Patent Document 1: JP-A-2003-314792
Patent Document 2: WO2007/055146
Patent Document 3: JP-A-2007-63029

DISCLOSURE OF THE INVENTION

Problems to be Solved by the Invention

As described in Patent Document 3, hydrogen-generating agents have a general property of reacting with water or some other to swell easily. The inventors have investigated to make it clear that when a hydrogen-generating agent is held in a container that may not be deformed in the state that the agent is constrained, the advance of the reaction is easily ended during the reaction. Reversely, when the reaction is advanced in the state that the hydrogen-generating agent is permitted to swell freely, the reaction rate is easily affected by a change in the environmental temperature and the reaction rate is easily made instable by the disproportionation of the swelling state, so that the repeatability of the reaction is poor; this matter has also been made clear. It has been found out that when water or some other is supplied thereto through a water absorber, such phenomena become particularly remarkable owing to the state of contact between the water absorber and the hydrogen-generating agent.

Thus, an object of the present invention is to provide a packaged hydrogen-generating agent which is high in the stability and repeatability of a hydrogen-generating reaction therein, and is preferably less affected by a change in the environmental temperature; a manufacturing method therefor; and a hydrogen generation method.

Solutions to the Problems

In order to attain the object, the present inventors have made eager researches to find out that by arranging a covering member that constrains a peripheral face of a hydrogen-generating agent and is deformable, the hydrogen generation reaction is improved in stability and repeatability. Thus, the present invention has been made.

Accordingly, the packaged hydrogen-generating agent of the present invention comprises a hydrogen-generating agent, and a covering member that constrains a peripheral face of the hydrogen-generating agent and is deformable. The packaged hydrogen-generating agent of the present invention has the covering member, which constrains the peripheral face of the hydrogen-generating agent and is deformable; therefore, according to this agent, when the hydrogen-generating agent reacts with a reaction liquid such as water to swell, the disproportionation of the swelling state is not easily caused. Thus, the reaction rate is easily made stable, and the repeatability of the reaction also becomes good. Furthermore, the peripheral face of the hydrogen-generating agent is constrained by the covering member that is deformable; therefore, it does not easily occur that the constraint becomes excessive so that the advance of the reaction is hindered. As a result, the present invention can provide a packaged hydrogen-generating agent wherein a hydrogen-generating reaction is high in stability and repeatability.

In the packaged hydrogen-generating agent, the covering member is preferably a thermally shrinkable covering member. When the environmental temperature is high to make the reaction rate large so that the temperature of the hydrogen-generating agent is raised, the use of the thermally shrinkable covering member makes the shrinking force of the covering member larger to restrain the advance of the reaction liquid, so that the reaction rate is lowered. Thus, a hydrogen generation reaction which is not easily affected by a change in the environmental temperature can be realized. Furthermore, when the hydrogen-generating agent is covered, the use of the thermally shrinkable covering member makes it possible to constrain the hydrogen-generating agent evenly into an appropriate degree only by shrinking the covering member thermally. Thus, the covering member is more favorable than other covering members from the viewpoint of manufacturing process. Furthermore, the thermally shrinkable covering member has a security-keeping function that when a rapid reaction is caused by any trouble so that heat is generated, the member is thermally shrunken at a large level to stop the hydrogen-generating reaction.

It is preferred that the covering member is a cylindrical and thermally shrinkable covering material (for example, a thermally shrinkable tube), the hydrogen-generating agent is held inside the thermally shrunken covering member, and further a lid body is held at an end of the thermally shrunken covering member. When the cylindrical and thermally shrinkable covering member is used to hold the lid body at the end of the thermally shrunken covering member, the sealing effect of the end portion is made high so that the hydrogen-generating reaction is made higher in stability and repeatability. Moreover, through a simple step based on the thermal shrinkage, the hydrogen-generating agent can be evenly constrained into an appropriate degree with the covering member.

The hydrogen-generating agent is an agent wherein a granular hydrogen-generating substance is contained in a matrix of a resin. The hydrogen-generating agent is a hydrogen-generating agent particularly preferred for the present invention since the reaction of the hydrogen-generating substance is restrained to some degree and further the reaction is restrained by suppressing the entry of the reaction liquid.

It is also preferred that the packaged hydrogen-generating agent further comprises a water absorber that partially contacts the hydrogen-generating agent, wherein the covering member covers at least a peripheral face of contact regions of the water absorber and the hydrogen-generating agent to bring the contact regions into close contact with each other. When the water absorbent is brought into contact with the hydrogen-generating agent to supply the reaction liquid, the supply of the reaction liquid can be made relatively stable since the supply of the reaction liquid is attained through the water absorbent; however, the state of the contact between the water absorbent and the hydrogen-generating agent easily becomes instable. Against this, when the peripheral face of the contact regions is covered with the covering member, which constrains the peripheral face of the hydrogen-generating agent and is deformable, to bring the contact regions of the water absorbent and the hydrogen-generating agent into close contact with each other as in the present invention, the state of the contact between the water absorbent and the hydrogen-generating agent is made stable. Thus, the hydrogen-generating reaction is made better in stability and repeatability.

In the meantime, the method of the present invention for manufacturing a packaged hydrogen-generating agent comprises the step of shrinking a cylindrical and thermally shrinkable covering member thermally in the state that a hydrogen-generating agent is arranged inside the covering member. According to the manufacturing method of the present invention, the cylindrical and thermally shrinkable covering member is used and is thermally shrunken so that the hydrogen-generating agent can be evenly constrained into an appropriate degree with the covering member through this step, which is simple. This is deformable; thus, a packaged hydrogen-generating agent can be produced, which is high in the stability and the repeatability of a hydrogen-generating reaction therein, and which is not easily affected by a change in the environmental temperature.

Additionally, the hydrogen generation method of the present invention is characterized in that the packaged hydrogen-generating agent described in any one of the above-mentioned paragraphs is used for generating hydrogen, while supplying a reaction liquid to the hydrogen-generating agent thereof. According to the hydrogen generation method of the present invention, the packaged hydrogen-generating agent of the present invention is used, so that the above-mentioned effects and advantages are obtained. Thus, the method is a hydrogen generation method which is high in the stability and repeatability of a hydrogen-generating reaction therein and is not easily affected by a change in the environmental temperature.

It is preferred to use the packaged hydrogen-generating agent which further comprises a water absorber that partially contacts the hydrogen-generating agent and comprises, as the covering member, a covering member covering at least a peripheral face of contact regions of the water absorber and the hydrogen-generating agent to bring the contact regions into close contact with each other, thereby supplying a reaction liquid through the water absorbent to the hydrogen-generating agent to generate hydrogen. According to this hydrogen generation method, use is made of the packaged hydrogen-generating agent covered with the covering member, which constrains the peripheral face of the hydrogen-generating agent and is deformable, so as to bring the contact regions of the water absorbent and the hydrogen-generating agent into close contact with each other, thereby making the state of the contact between the water absorbent and the hydrogen-generating agent stable. Thus, the hydrogen-generating reaction is made better in stability and the repeatability.

EMBODIMENTS OF THE INVENTION

Figure 1:
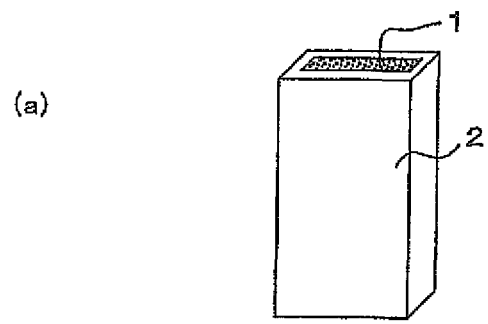
FIG. 1 are each a perspective view illustrating an example of the packaged hydrogen-generating agent of the present invention.
Figure 1:
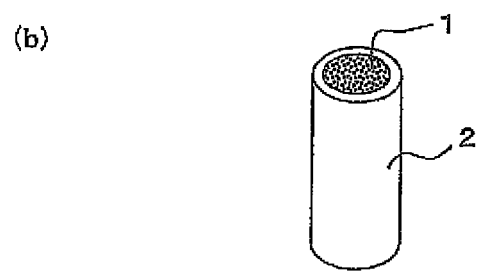
Figure 1:
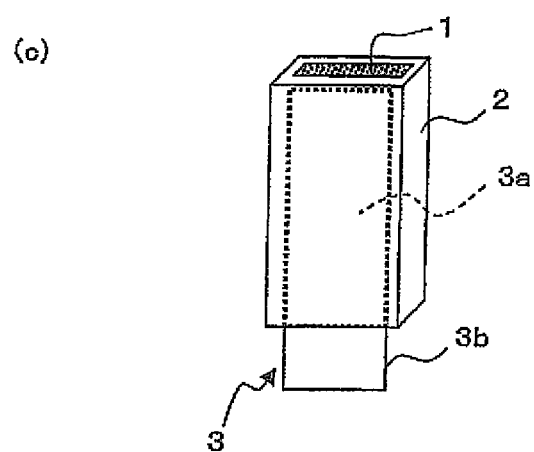

As illustrated in FIG. 1, a packaged hydrogen-generating agent of the present invention has a hydrogen-generating agent 1, and a covering member 2 that constrains a peripheral face of the hydrogen-generating agent 1 and is deformable. The form of the covered hydrogen-generating agent 1 may be any form, such as the form of a quadrangular prism, a circular column, a plate, a rod, a rectangular parallelepiped, or a cube. In each of the examples illustrated in FIGS. 1(a) to 1(c), the used hydrogen-generating agent 1 has the form of a quadrangular prism or a circular column.

Figure 2:
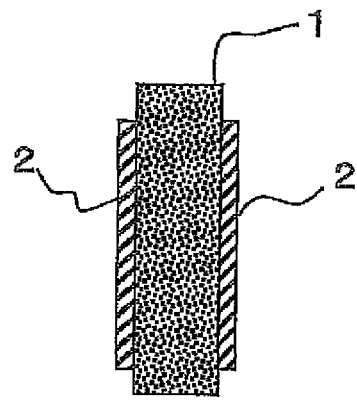
FIG. 2 are each a sectional view illustrating another example of the packaged hydrogen-generating agent of the present invention.
Figure 2:
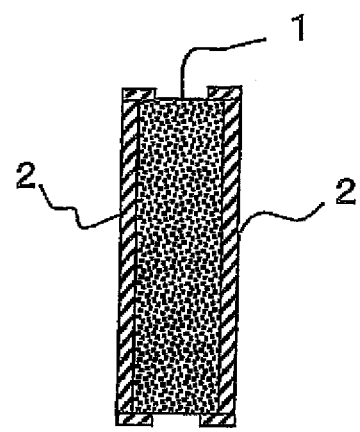
Figure 2:
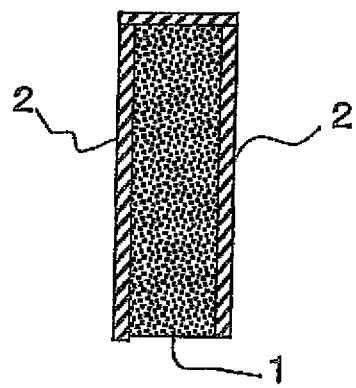
Figure 3A:
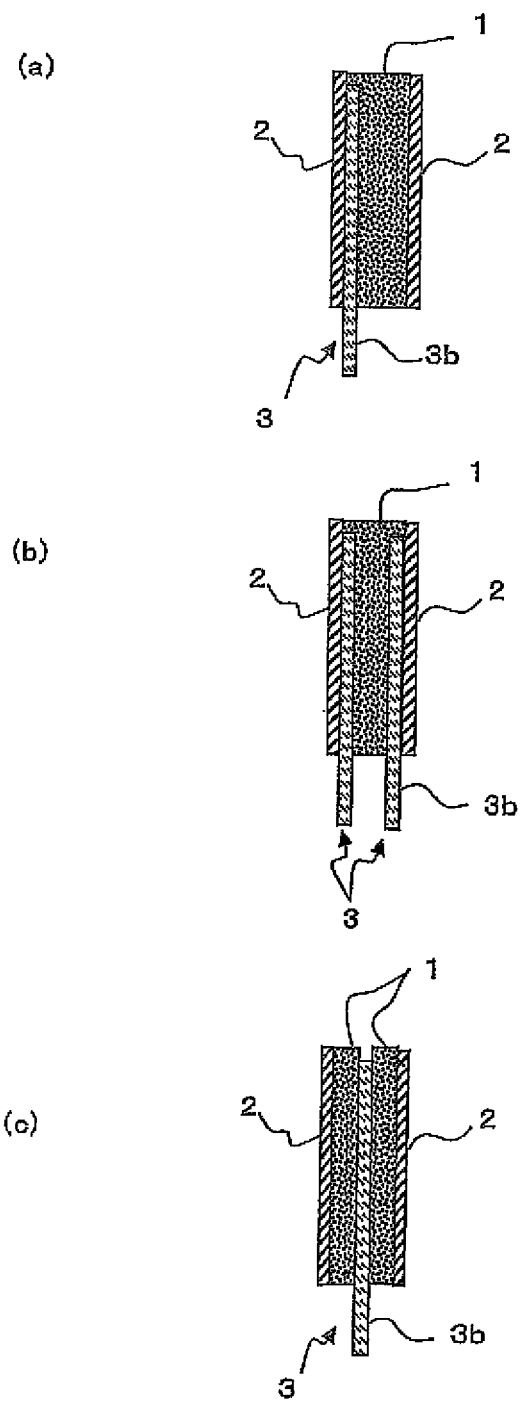
FIG. 3A are each a sectional view illustrating still another example of the packaged hydrogen-generating agent of the present invention.
Figure 3B:
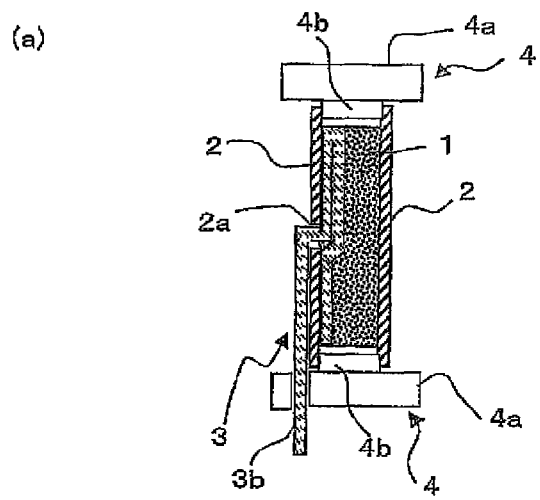
FIG. 3B are each a view of a different example of the packaged hydrogen-generating agent of the present invention.
Figure 3B:
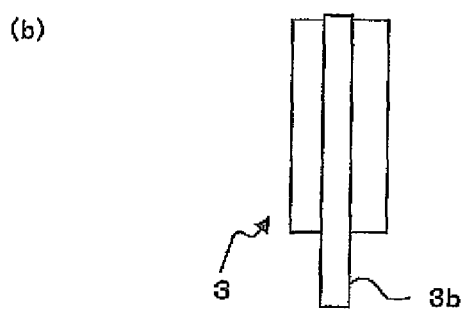
Figure 3B:
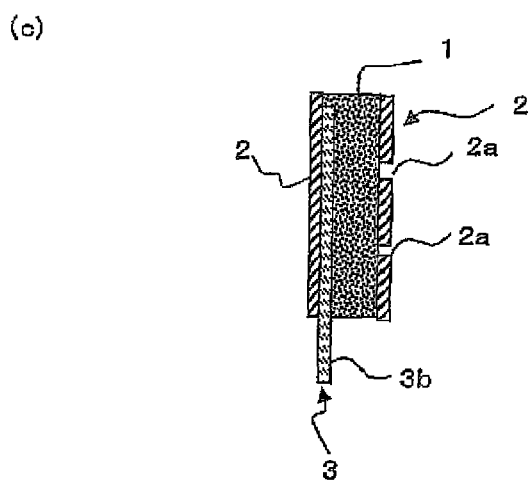

As illustrated in FIG. 2(a), the covering of the hydrogen-generating agent 1 with the covering member 2 may be attained in such a manner that all side walls of the hydrogen-generating agent 1 are not covered so that the side walls are partially uncovered. As illustrated in FIG. 2(b), it is also allowable that all side walls of the hydrogen-generating agent 1 are covered and further the bottom surface and the upper surface of the hydrogen-generating agent 1 are partially covered. As illustrated in FIG. 2(c), either the upper surface or the bottom surface of the hydrogen-generating agent 1 may be completely covered. Furthermore, as illustrated in FIG. 3B(c), the covering member 2 may have openings 2a through which hydrogen gas is easily discharged. In short, the wording "constraining a peripheral face of the hydrogen-generating agent" means that an entire periphery or circumference of at least one portion of the side wall of the hydrogen-generating agent 1, which has a given shape, is covered to be constrained.

As illustrated in FIG. 1(c), it is preferred that the packaged hydrogen-generating agent of the present invention further has a water absorbent 3 that partially contacts the hydrogen-generating agent 1. In order that contact regions 3a of the water absorbent 3 and the hydrogen-generating agent 1 can be brought into close contact with each other, it is more preferred that at least a peripheral face of the contact regions 3a is covered. At this time, the contact between the water absorbent 3 and the hydrogen-generating agent 1 needs only to satisfy the following: the water absorbent 2 contacts at least one portion of the surface of the hydrogen-generating agent 1. As illustrated in FIG. 3A(a), it is preferred that the hydrogen-generating agent 1 and the water absorbent 3 contact each other to extend the contact area of the hydrogen-generating agent 1 over substantially the whole of the surface of the agent 1.

As illustrated in FIG. 3A (b), the water absorbent 3 may be laid onto each of the front and rear surfaces of the hydrogen-generating agent 1. In FIG. 3A(b), one of the water absorbents may be extended upward to absorb water from both of the upside and the downside. As illustrated in FIG. 3A(c), plural hydrogen-generating agents 1 may be used to make a structure wherein the water absorbent 3 is sandwiched therebetween. An extended region 3b, which is a partial region of the water absorbent 3, is extended to the outside of the covering member 2.

As illustrated in 3B(a), the packaged hydrogen-generating agent may be made into a structure wherein the water absorbent 3 is partially projected outward from the openings 2a provided in the covering member 2, whereby water can be supplied from a middle region of the hydrogen-generating agent 1 thereto and further hydrogen gas flows along the water absorbent 3 to be easily discharged. In this structure, the water absorbent 3 is made into, for example, a structure as illustrated in FIG. 3B(b), wherein the water absorbent is twice-folded at boundaries between its large-width regions and its small-width region. An end of the small-width region is the extended region 3b.

As illustrated in FIG. 3B(a), in the case of the structure wherein water can be supplied from the middle region of the hydrogen-generating agent 1 thereto, it is preferred to set lid bodies 4 to both side ends of the covering member 1, respectively. In this way, the following can be effectively prevented: liquid droplets of the reaction liquid (for example, water droplets condensed onto the inner wall of the container), so that the reaction becomes instable. The lid bodies 4 each have a function, as a guide, of holding the packaged hydrogen-generating agent stably inside the container through their brims 4a. The lid bodies 4 may be integrated with the packaged hydrogen-generating agent by a method of inserting their inserting regions 4b into the covering member 2 under pressure, a method of shrinking the covering member 2 thermally in the state that the inserting regions 4b are unfittingly inserted into the covering member 2, or some other method.

Figure 3C:
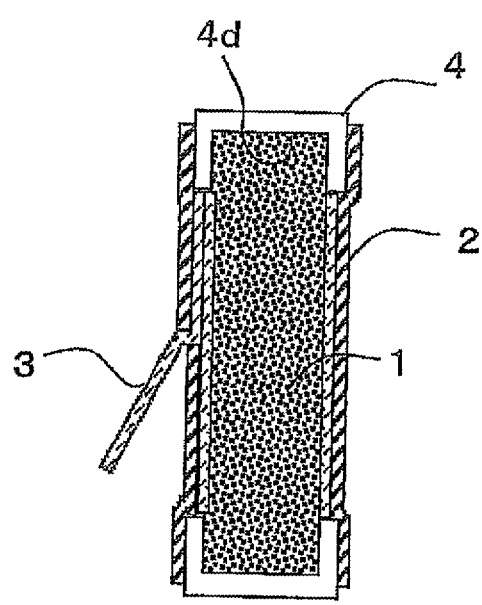
FIG. 3C is a sectional view of a different example of the packaged hydrogen-generating agent of the present invention.

As illustrated in FIG. 3C, a lid body 4 having a concave 4d may be used to form a structure wherein an end of the hydrogen-generating agent 1 is inserted in the concave 4d. This makes it possible to constrain the end of the hydrogen-generating agent 1 with the concave 4d, so as not to swell. Thus, the hydrogen-generating reaction can be made more stable. The lid body 4 having the concave 4d may have a structure capable of constraining the whole of the periphery or circumference of the end of the hydrogen-generating agent 1 (when the end is rectangle, the whole is its four faces), a structure capable of constraining two of the faces of the end, or some other structure.

The hydrogen-generating agent used in the present invention may be a singly-used hydrogen-generating substance in the form of grains or some other, which is used without being enveloped in any resin, and is preferably in case where a granular hydrogen-generating substance is contained in a matrix of a resin. At this time, the used resin is preferably a resin other than any water-soluble resin in order to cause a constraining force to be obtained through the covering member.

Examples of the hydrogen-generating substance include metal hydrides such as calcium hydride, lithium hydride, potassium hydride, lithium aluminum hydride, aluminum sodium hydride, and magnesium hydride; metals such as aluminum, iron, magnesium, and calcium; and metal hydrogen complex compounds such as boron hydride compounds. Of these examples, metal hydrides are preferred, and calcium hydride is particularly preferred. Metal hydride compounds may be used in combinations of two or more thereof, as well as metals or metal hydrogen compounds. Moreover, these substances may be used in combination of two or more different-kind substances from the substances.

Specifically, the hydrogen-generating agent is in particular preferably an agent wherein granular calcium hydride ($CaH_2$) is contained in a matrix of a resin other than any water-soluble resin. In this hydrogen-generating agent, granular calcium hydride turns into the state of being dispersed or buried in the resin matrix, thereby restraining the reactivity of calcium hydride. Thus, the hydrogen-generating agent is improved in handleability when the agent reacts with water. Moreover, the use of calcium hydride as the hydrogen-generating substance makes the reactivity of the agent with water or the like high. Thus, when the agent reacts with water or the like, the produced reaction material (calcium hydroxide) becomes high in volume expansion ratio to enhance an effect of causing the resin matrix to disintegrate. As a result, the reaction with water or the like is naturally advanced up to the inside with ease.

The content by percentage of the hydrogen-generating substance in the hydrogen-generating agent is preferably 60% or more by weight. In order that the resin matrix may be caused to disintegrate in the reaction while the shape-keeping performance is maintained, the content by percentage of the substance in the hydrogen-generating agent is preferably from 60 to 90% by weight, more preferably from 70 to 85% by weight.

The average particle diameter of the granular hydrogen-generating substance is preferably from 1 to 100 µm, more preferably from 6 to 30 µm, even more preferably from 8 to 10 µm from the viewpoint of the dispersibility thereof in the resin or an appropriate control of the reaction.

In the case of adding, to calcium hydride, a different hydrogen-generating substance, the content by percentage of the hydrogen-generating substance in the hydrogen-generating agent is preferably from 0 to 20% by weight, more preferably from 0 to 10% by weight, even more preferably from 0 to 5% by weight.

When the hydrogen-generating substance in the form of grains or some other is used without being enveloped in any resin, it is preferred to bond a resin as a binder to the hydrogen-generating substance or subject this substance to press-forming to be made into a tablet in order to cause the constraining force based on the covering member to act through an appropriate power.

The resin is preferably a resin other than any water-soluble resin. The resin is, for example, thermosetting resin, thermoplastic resin, or heat-resistant resin, and is preferably thermosetting resin. The use of the thermosetting resin generally makes the resin matrix brittle with ease. Thus, at the time of the reaction, the resin matrix disintegrates more easily so that the reaction is naturally advanced with ease. Examples of the thermoplastic resin include polyethylene, polypropylene, polystyrene, acrylic resin, fluorine-contained resin, polyester, and polyamide. Examples of the heat-resistant resin include aromatic polyimide, polyamide, and polyester.

Examples of the thermosetting resin include epoxy resin, unsaturated polyester resin, phenol resin, amino resin, polyurethane resin, silicone resin and thermosetting polyimide resin. Of these examples, epoxy resin is preferred since the resin matrix has an appropriate disintegrating property in the hydrogen-generating reaction. When the thermosetting resin is set, a hardening agent, a hardening accelerator or some other is appropriately used together therewith if necessary.

The content by percentage of the resin is preferably less than 40% by weight. In order that the resin matrix may be caused to disintegrate in the reaction while the shape-keeping performance is maintained, the content by percentage of the resin in the hydrogen-generating agent is preferably from 5 to 35% by weight, more preferably from 10 to 30% by weight.

The used hydrogen-generating agent may contain other components such as a catalyst or a filler as optional components other than the above-mentioned components. It is effective to use, as the catalyst, an alkali compound such as sodium hydroxide, potassium hydroxide or calcium hydroxide, as well as a metal catalyst for hydrogen-generating agents.

The hydrogen-generating agent may have a porous structure, and preferably has a substantially solid structure. Specifically, about the hydrogen-generating agent in the present invention, the porosity (%) thereof=[(the volume of pores/the total volume)×100] is preferably 5% or less, more preferably 2% or less, even more preferably 1% or less. Usually, in a structure wherein the proportion of pores is small, the reaction is not easily advanced up to the inside. In the present invention, however, calcium hydride may be used at a high concentration, thereby making it possible to advance the reaction even at such a low porosity. Thus, the hydrogen-generating agent can be made high in volume efficiency.

When the hydrogen-generating substance such as calcium hydride is mixed with the resin, or reacts, hydrogen may be generated therefrom so that pores may be generated therein. However, when the hydrogen-generating substance is subjected to hardening by reaction or solidification by cooling under pressure, the substance can gain a substantially solid structure.

The used hydrogen-generating agent may be in any form, such as the form of a sheet, grains (pulverized product), or a lump (shaped product). The agent is preferably in the form of a sheet, a plate, a column or some other from the viewpoint of the control of the reaction rate. When the agent is pulverized, the grain diameter thereof is preferably from 1 to 10 mm, more preferably from 2 to 5 mm.

The hydrogen-generating agent in the present invention is preferably produced by a producing process containing the step of hardening a mixture wherein granular calcium hydride is contained in an unset thermosetting resin at a concentration of 60% or more by weight. The mixture may contain the above-mentioned other components, a hardening agent and others.

In the present invention, it is preferred to perform the mixture-hardening step under pressure. About pressuring conditions when the pressuring is performed, the pressure is preferably from 1 to 100 MPa, more preferably from 2 to 50 MPa, more preferably from 5 to 30 MPa in order to permit the porosity of the hydrogen-generating agent to be lowered while costs and a machine for the production are considered. For the pressuring, a mold for press-forming, or some other may be used.

In the case of using, as a resin other than the thermosetting resin, for example, a thermoplastic resin, the hydrogen-generating agent in the present invention may be produced by a method of mixing granular calcium hydride with the resin to give a concentration of 60% or more by weight at a temperature equal to or higher than the softening point of the resin, and then cooling and solidifying the mixture. In the same way as in the case of the thermosetting resin, in the case of the heat-resistant resin, the agent-producing method may be, for example, a method of incorporating calcium hydride into a softened precursor thereof, and then causing a reaction to harden the mixture.

The covering member used in the present invention is a member that constrains a peripheral face of the hydrogen-generating agent and may be elastically or plastically deformed, and is preferably a covering member that may be elastically deformed. The covering member is preferably a member which attains the covering in the form of only one layer, and may be a member which attains the covering in the form of two or more layers.

Examples of the covering member that may be elastically deformed include a tube of a resin elastomer, an adhesive tape of a resin substrate, a rubbery tube, an adhesive tape of a rubbery substrate, and a C-shaped sleeve of a metallic elastomer. Examples of the covering member that may be plastically deformed include a plastically deformable resin tube, and an adhesive tape of a resin substrate.

In the present invention, it is particularly preferred to use a thermally shrinkable covering member, and it is more preferred to use a thermally shrinkable tube. The thermally shrinkable tube has a property of being elastically or plastically deformed before the shrinkage thereof is completed.

The matter of the thermally shrinkable tube may be a widely-usable thermally shrinkable tube made of vinyl chloride, polyvinylidene fluoride, ethylene propylene rubber, neoprene, polyolefin or some other, and is preferably a heat-resistant thermally shrinkable tube. Examples of the heat-resistant thermally shrinkable tube include tetrafluoroethylene/perfluoroalkyl vinyl ether copolymer (PFA), tetrafluoroethylene/hexafluoropropylene copolymer (FEP), tetrafluoroethylene/ethylene copolymer (ETFE), polytetrafluoroethylene (PTFE), and silicone rubber.

The thickness of the covering member is, for example, from 1 μm to 5 mm. In the case of using, in particular, a thermally shrinkable covering member, the thickness is preferably from 10 to 3000 μm, more preferably from 100 to 2000 μm in order to permit the member to gain an appropriate constraining force.

When a water absorbent is set in the present invention, the absorbent turns into a state that the absorbent partially contacts the hydrogen-generating agent. The water absorbent may be any water absorbent into which water is permeable, and is preferably a filter paper piece, a water absorbable felt, a water absorbable resin, an absorbent cotton tuft, a water absorbable nonwoven cloth piece, a water absorbable paper piece, or some other.

The water absorbent is preferably from 0.05 to 3 mm thick, more preferably from 0.1 to 1 mm thick in order to supply a reaction liquid such as water to the hydrogen-generating agent at an appropriate level.

The packaged hydrogen-generating agent of the present invention may be manufactured by covering a hydrogen-generating agent subjected to shaping or some other with a covering member having a size permitting a peripheral face of the agent to be constrained with the member. At this time, it is necessary that while, for example, a resin tube is enlarged in diameter, the hydrogen-generating agent is covered therewith. However, by using a thermally shrinkable tube and heating the tube, the covering with the covering member can easily be attained to constrain the peripheral face of the hydrogen-generating agent.

The manufacturing method of the present invention is a method using such a thermally shrinkable covering member, and is characterized by including the step of shrinking a cylindrical and thermally shrinkable covering member thermally in the state that a hydrogen-generating agent is arranged inside the covering member. When the hydrogen-generating agent is arranged, it is preferred to mold the agent beforehand.

The inside diameter of the covering member is preferably from 100 to 500% of the outside diameter, more preferably from 110 to 300% thereof to permit a uniform constraining state to be attained.

When the covering member is thermally shrunken, the temperature thereof, which depends on the shrinking property of the covering member, is preferably from 70 to 150° C., more preferably from 80 to 120° C., considering the temperature of the hydrogen-generating agent in the reaction. It is preferred to use a thermally shrinkable covering member having a shrinkage percentage of 20 to 95% in this temperature range. The shrinkage percentage is more preferably from 50 to 80%.

The hydrogen generation method of the present invention is a method of using a packaged hydrogen-generating agent as described above to generate hydrogen while supplying a reaction liquid to the hydrogen-generating agent thereof. Examples of the reaction liquid include water, aqueous acidic solutions, and aqueous alkaline solutions. The temperature of the supplied reaction liquid may be room temperature. The liquid may be heated to a temperature of 30 to 80° C.

In the present invention, the hydrogen generation method is preferably a method of supplying the reaction liquid to the hydrogen-generating agent through a water absorbent that partially contacts the hydrogen-generating agent in order to make the reaction rate constant.

About the supply of the reaction liquid, the amount of the supply may be adjusted in accordance with the amount of hydrogen gas to be generated. However, even when the liquid is excessively supplied, hydrogen can be generated at an appropriate generation rate since the reaction rate is controlled in this invention.

In the present invention, a peripheral face of the used packaged hydrogen-generating agent is covered; therefore, even by a method of immersing the packaged hydrogen-generating agent into an excessive amount of the reaction liquid, hydrogen can be generated at an appropriate generation rate.

Since the packaged hydrogen-generating agent of the present invention can make the device structure of a hydrogen-generating device simple, the present invention is useful, in particular, for a case where the package is used in a hydrogen supplying device in a fuel cell for a portable instrument.

EXAMPLES

Hereinafter, a description will be made about Examples which specifically demonstrate the structure and the advantageous effects of the present invention, and others. About evaluating items in the Examples and the others, measurements were made as follows:

(1) Average Particle Diameter

A scanning electron microscope (SEM) was used to take a photograph of particles, and from those in the photograph a particle having a mean particle diameter was selected. The length of the major axis thereof and that of the minor axis were averaged.

(2) Porosity

The pore volume was calculated as a difference between an actually measured volume of the sample and a volume of the sample that was calculated by dividing an actually measured mass of the sample by the density of the material itself. The porosity (%) thereof was calculated from the following equation: porosity (%)=(the pore volume/the volume of the whole)×100

Production Example 1

Production of Hydrogen-generating Agents

To 11.7 g of an unset epoxy resin (jER 828 manufactured by Japan Epoxy Resins Co., Ltd.) was added 37.6 g of $CaH_2$ (manufactured by Wako Pure Chemical Industries, Ltd.; average particle diameter: 10 μm), and the mixture was stirred. Thereafter, thereto were further added 0.7 g of a dicyan diamide type hardener (DICY7 manufactured by Japan Epoxy Resins Co., Ltd.) and 0.12 g of a modified aliphatic (tertiary amine) hardening accelerator (trisdimethylaminomethylphenol, 3010 manufactured by Japan Epoxy Resins Co., Ltd.), and then the mixture was stirred.

This mixture was applied onto the inside (10 mm×32 mm×4.3 mm in depth) of each of molds, and then in the state that the upper face thereof was pressed (pressure: 10 MPa), the mixture was dried and hardened for about 60 minutes in a drying machine (set temperature: 120° C.). About the resultant hardened products, the thickness was 4.5 mm, the $CaH_2$ content by percentage was 75% by weight, and the porosity was 1%.

Example 1

Repeatability Test

Figure 4:
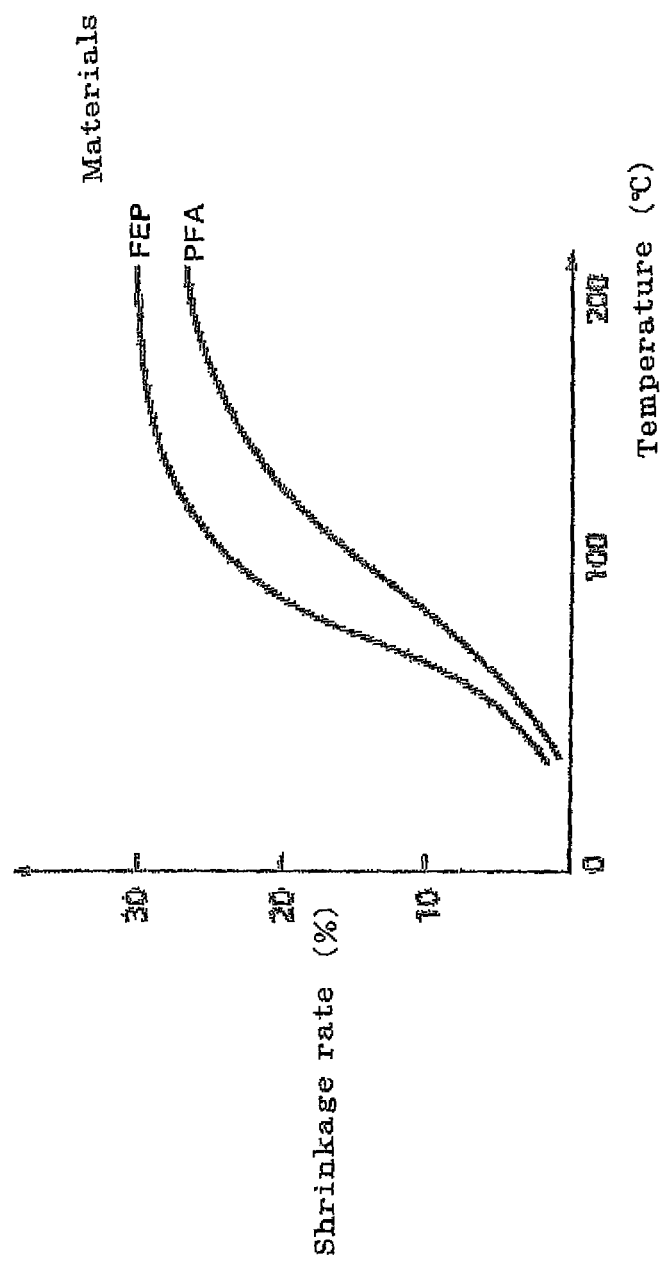
FIG. 4 is a graph showing the shrinkage characteristic of thermally shrinkable tubes used in Examples.

One of the plate-form molded bodies of the hydrogen-generating agent obtained in Production Example 1 was used, and a filter paper piece was partially brought into contact with a substantially entire area (8 mm×30 mm) of the surface of the body. The molded body was then covered with a thermally shrinkable tube (FEP type; inside diameter: 10.6 mm, length: 38 mm, and thickness: 300 µm) to extend the other area outward. At this time, the inside diameter of the thermally shrinkable tube was 115% of the outside diameter of the hydrogen-generating agent. This was put into an oven and then heated at 150° C. for 10 minutes to shrink the thermally shrinkable tube, thereby producing a packaged hydrogen-generating agent having a peripheral area covered to bring the contact regions of the filter paper piece and the hydrogen-generating agent with each other. The shrinkage characteristic of the used thermally shrinkable tube is shown in FIG. 4.

Figure 5:
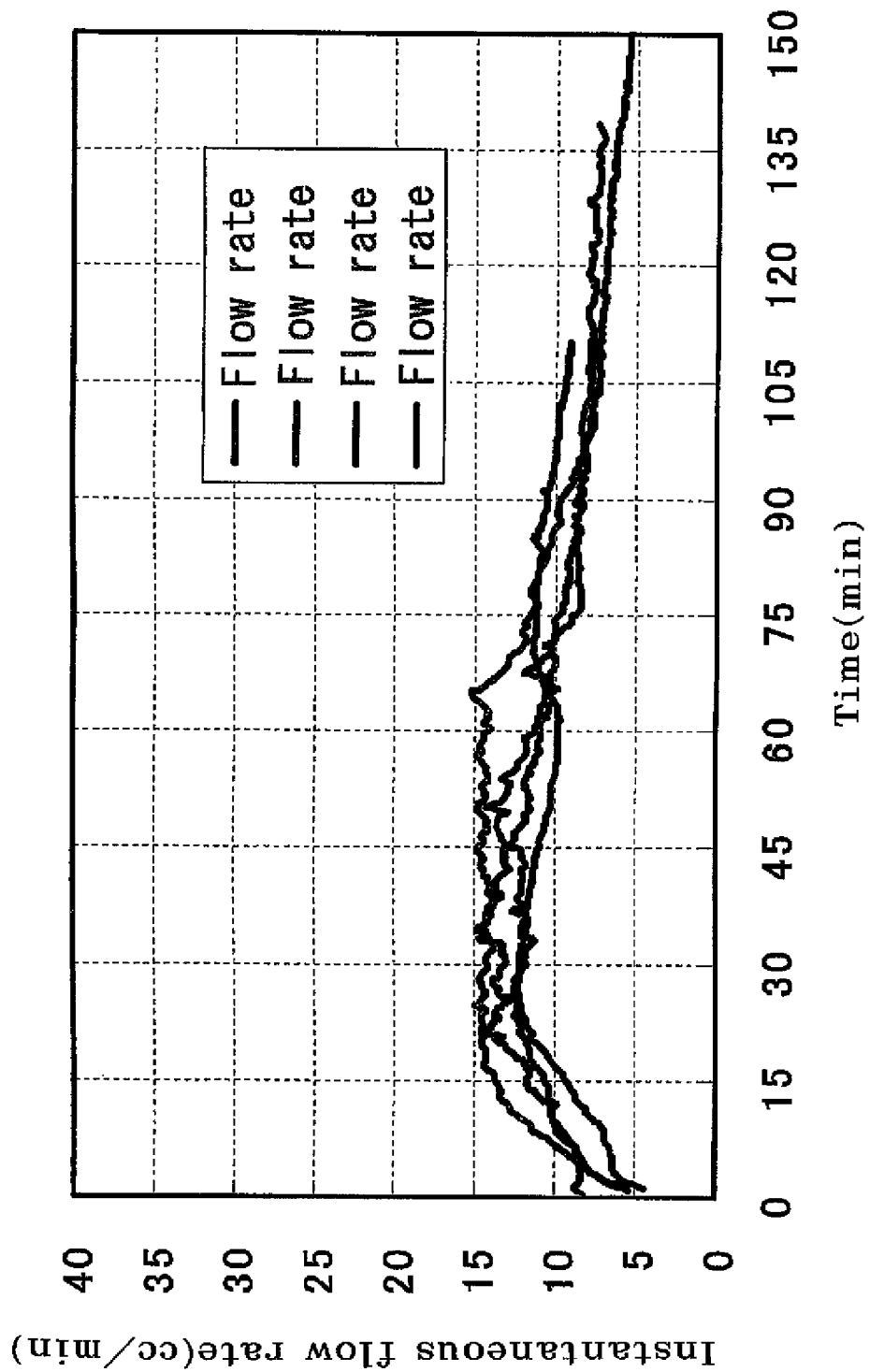
FIG. 5 is a graph showing each change in the hydrogen-generating rate (instantaneous flow rate) in Example 1 with the passage of time.

In the same manner as this packaged hydrogen-generating agent, the same agents, the number of which was 4, were produced. About each of the four packages, hydrogen-generating reaction was caused as follows: in the state that the packaged hydrogen-generating agent was erected, the filter paper piece extended outward was partially immersed into water in a container. In this way, water was supplied from the container through the filter paper piece to the molded body to conduct hydrogen-generating reaction for about 2 hours. The results are shown in FIG. 5. As shown in this figure, about the four, the processes proceeded with substantially the same instantaneous flow rate. Thus, it was understood that the hydrogen-generating reaction was high in stability and repeatability.

Comparative Example 1

Repeatability Test

Figure 6:
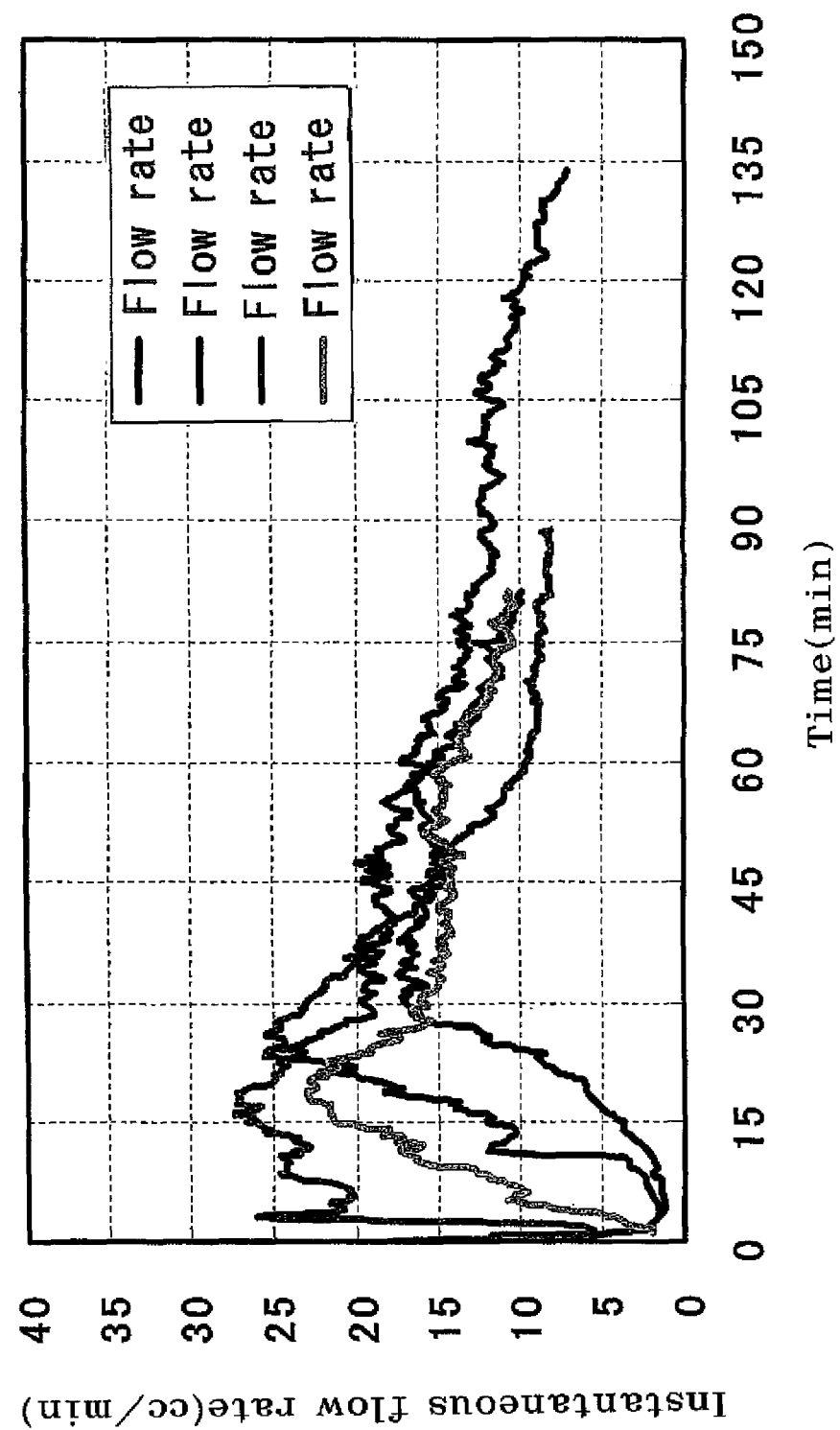
FIG. 6 is a graph showing each change in the hydrogen-generating rate (instantaneous flow rate) in Comparative Example 1 with the passage of time.

Four packages were each used to cause hydrogen-generation reaction in the same way as in Example 1 except that when the same hydrogen-generating agent molded body and filter paper piece as in Example 1 were used to bring the two into contact with each other by the same area, an adhesive tape was used to bond and fix the two to each other. The results are shown in FIG. 6. As shown in this figure, the four instantaneous flow rates varied largely, and the instantaneous flow rates were each instable. Thus, it was understood that the hydrogen-generating reaction was very low in stability and repeatability.

Example 2

Test Wherein the Environmental Temperature was Varied, and FEP was Used

Some of the plate-form hydrogen-generating-agent molded bodies obtained in Production Example 1 were each used, and a filter paper piece was partially brought into contact with a substantially entire area (8 mm×30 mm) of the surface thereof. The molded body was then covered with a thermally shrinkable tube (FEF type; inside diameter: 10.6 mm, length: 38 mm, and thickness: 300 µm) to extend the other area outward. At this time, the inside diameter of the thermally shrinkable tube was 115% of the outside diameter of the hydrogen-generating agent. This was put into an oven and then heated at 150° C. for 10 minutes to shrink the thermally shrinkable tube, thereby producing each packaged hydrogen-generating agent having a peripheral area covered to bring the contact regions of the filter paper piece and the hydrogen-generating agent with each other. The shrinkage characteristic of each of the used thermally shrinkable tubes is shown in FIG. 4.

Figure 7:
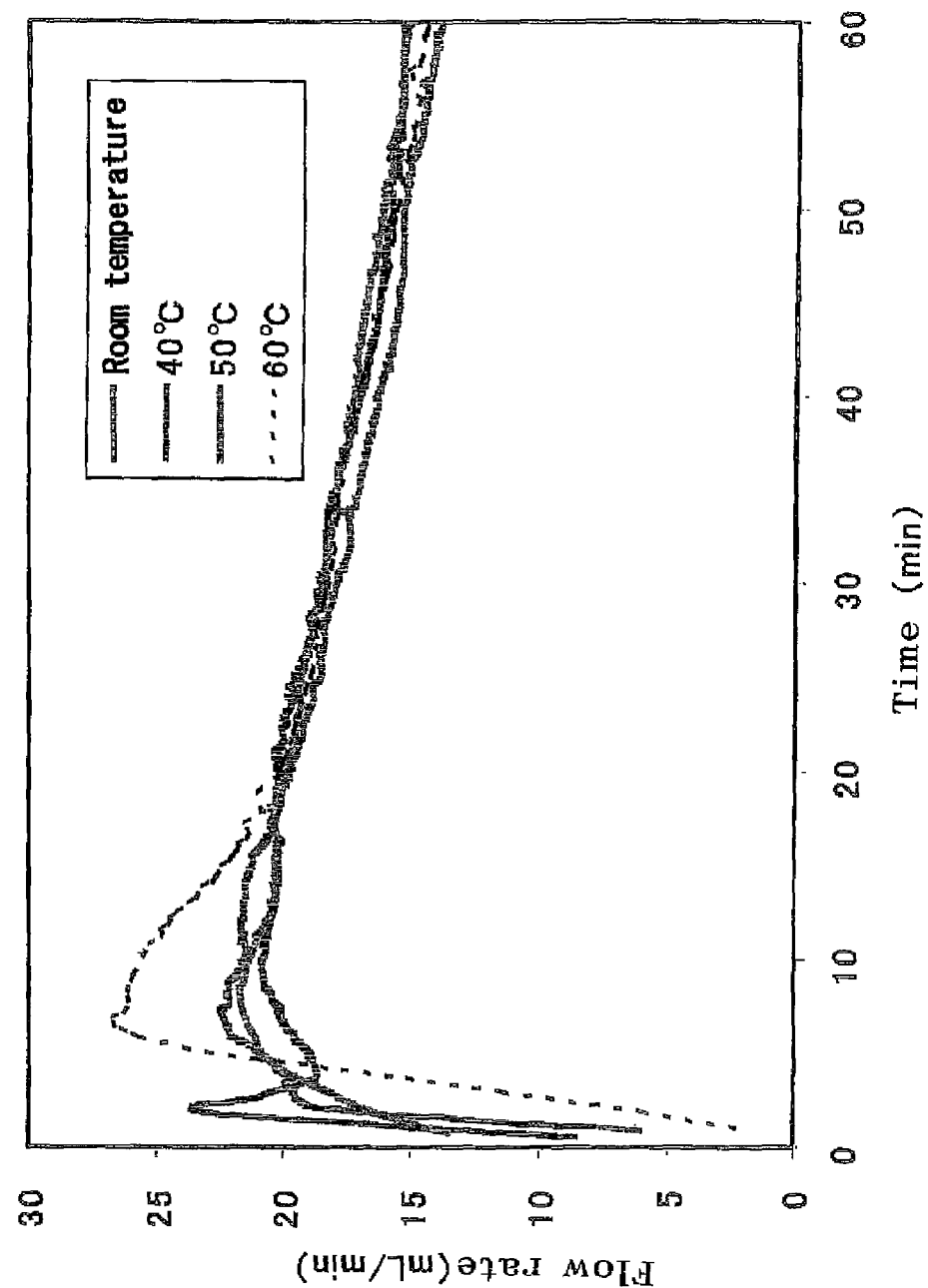
FIG. 7 is a graph showing each change in the hydrogen-generating rate (instantaneous flow rate) in Example 2 with the passage of time.

The packaged hydrogen-generating agents were used to cause hydrogen-generating reaction in thermostats having temperatures set to room temperature, 40° C., 50° C., and 60° C., respectively. Specifically, in the state that each of the packaged hydrogen-generating agents was erected, the filter paper piece extended outward was partially immersed into water in a container to supply water from the container through the filter paper piece to the molded body, thereby conducting hydrogen-generating reaction for 1 hour. The results are shown in FIG. 7. As shown in this figure, about all the environmental temperatures, the processes proceeded with substantially the same instantaneous flow rate. Thus, it was understood that the hydrogen-generating reaction was not easily affected by a change in the environmental temperature.

Example 3

Example Wherein No Water Absorbent was Used

Figure 8:
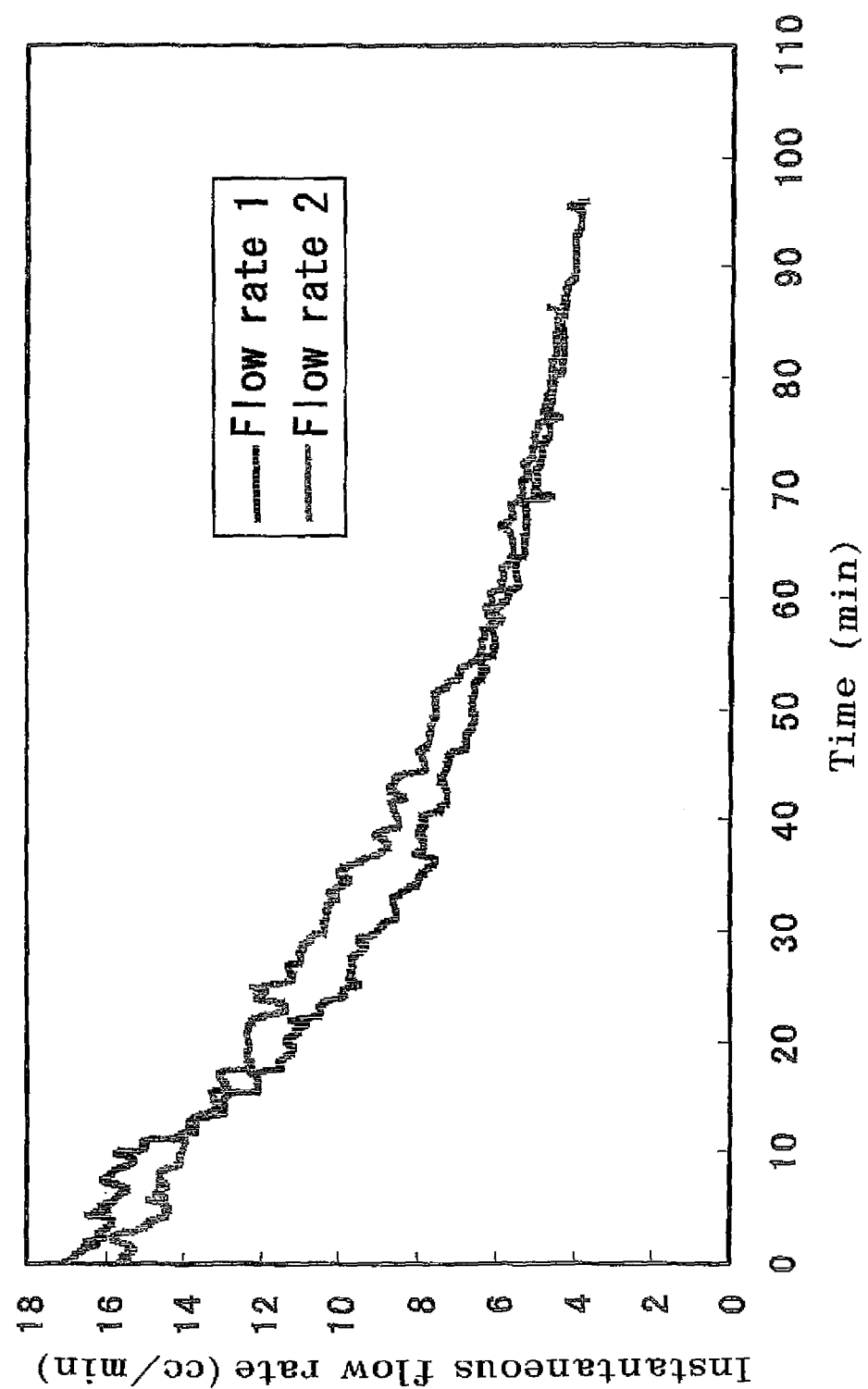
FIG. 8 is a graph showing each change in the hydrogen-generating rate (instantaneous flow rate) in Example 3 with the passage of time.

Packaged hydrogen-generating agents were each produced in the same way as in Example 1 except that without using any filter paper piece, the hydrogen-generating-agent-molded bodies were each covered with the thermally shrinkable tube, and both ends thereof were sealed and an opening having a diameter of 3 mm was made in a center of the tube. Two of the packaged hydrogen-generating agents were separately used, and immersed into water in a container to position the whole under the water surface. In this way, in each of the packages, water was supplied from the opening to the molded body to cause hydrogen-generation reaction for about 90 minutes. The results are shown in FIG. 8. As shown in this figure, even when no water absorbent was present, about the two, the processes proceeded with substantially the same instantaneous flow rate. Thus, it was understood that the hydrogen-generating reaction was high in stability and repeatability.

Example 4

Thermally shrinkable tubes changed in type

The following three-type thermally shrinkable tubes were used:

a tube, H-150 (Eishin International Co., Ltd.): shrinkable temperature: 150° C., shrinkage rate: 2/1, raw material: vinylidene fluoride resin, pre-shrinkage inside diameter: 9.5 mm, post-shrinkage inside diameter: 4.8 mm (maximum), and thickness: 0.3 mm (minimum), a tube, H-1 (Eishin International Co., Ltd.): shrinkable temperature: 80 to 100° C., shrinkage rate: 2/1, raw material: polyolefin, pre-shrinkage inside diameter: 9.9 mm, post-shrinkage inside diameter: 4.5 mm (maximum), and thickness: 0.56 mm (minimum), and a tube, HISHI (Mitsubishi Plastics, Inc.): shrinkable temperature: about more than 50° C., shrinkage rate: 2/1, raw material: polyvinyl chloride, pre-shrinkage inside diameter: 9.0 mm, and thickness (minimum): 0.07 mm.

Plate-form molded bodies of a hydrogen-generating agent that were yielded in the same way as in Production Example 1 but had a varied size (9 mm×37 mm×3.4 mm) were used, and a central region of a filter paper piece (9 mm wide×125 mm long×0.2 mm thick) was brought into contact with a substantially entire area (9 mm×37 mm) of the surface of each of the molded bodies. Both ends of each of the molded bodies were each pinched with a C-shaped lid body so as to extend both sides of the other area outward. The molded bodies were then covered with the three-type thermally shrinkable tubes, respectively, each of which had a slightly longer than the distance between the lid bodies at both the ends. These were put in an oven, and heated at the respective shrinkable temperatures of the tubes for 10 minutes to shrink the thermally shrinkable tubes, thereby producing each of packaged hydrogen-generating agents that held, at both of its ends, the lid bodies and had a peripheral face covered to bring contact regions of the filter paper piece and the hydrogen-generating agent into contact with each other.

Figure 9:
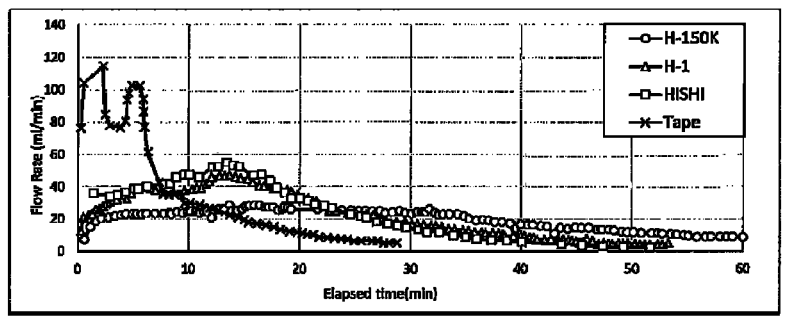
FIG. 9 is a graph showing each change in the hydrogen-generating rate (instantaneous flow rate) in Example 4 with the passage of time.

About each of the packages, hydrogen-generating reaction was caused as follows: in the state that the packaged hydrogen-generating agent was erected in a thermostat of 30° C. temperature, the package was put into a container. The filter paper piece extended outward was partially immersed into water (2.3 mL) in the container to supply water from the container through the filter paper piece to the molded body, thereby conducting hydrogen-generating reaction for about 1 hour. The results are shown in FIG. 9. Therein are also shown results of hydrogen-generating reaction in the case of winding a waterproof tape containing a urethane film as a substrate onto a hydrogen-generating agent and so on, thereby covering these members with the tape.

As shown in FIG. 9, about the three thermally shrinkable tubes, the processes proceeded with relatively stable instantaneous flow rates, respectively. Thus, it was understood that the hydrogen-generating reaction was high in stability. It was also understood that as the shrinkable temperature was higher, the peak of the hydrogen-generating reaction was further restrained. By contrast, it was understood about the hydrogen-generating agent on which the waterproof tape was wound that the peak of the hydrogen-generating reaction was large at the initial stage so that the stability of the hydrogen-generating reaction was deteriorated.

Example 5

Change in the Thermally-Shrinkable-Tube Inside-Diameter

Figure 10:
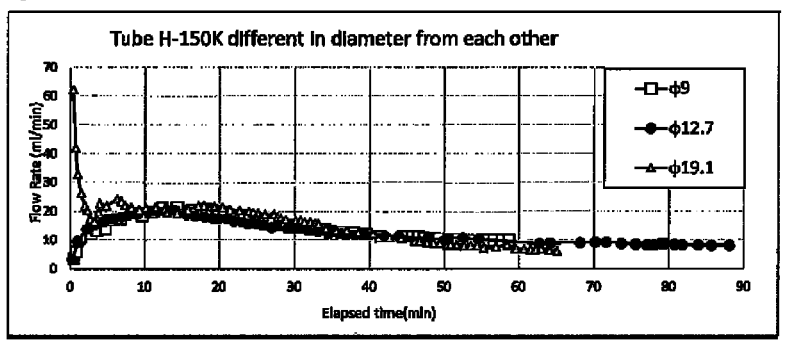
FIG. 10 is a graph showing each change in the hydrogen-generating rate (instantaneous flow rate) in Example 5 with the passage of time.

Hydrogen-generating reaction was caused for 1 hour under the same conditions as in Example 4 except that instead of the use of the tube H-150K, the pre-shrinkage inside diameter of which was 9.5 mm, the following were each used: a thermally shrinkable tube having the same raw material and shrinkage rate and having a pre-shrinkage inside diameter of 12.7 mm (post-shrinkage inside diameter: 6.4 mm (maximum), and thickness: 0.3 mm (minimum)); and a thermally shrinkable tube having the same raw material and shrinkage rate and having a pre-shrinkage inside diameter of 19.1 mm (post-shrinkage inside diameter: 9.5 mm (maximum), and thickness: 0.41 mm (minimum)). The results are shown in FIG. 10.

As shown in this figure, it was understood that when the pre-shrinkage inside diameter was too large, a sufficient sealing effect was not easily obtained at an end of the package so that a peak of the hydrogen-generating reaction was generated at the initial stage; by contrast, when the pre-shrinkage inside diameter was appropriate, the process proceeded with a relatively stable instantaneous flow rate so that the hydrogen-generating reaction was high in stability. This tendency was the same as about the tubes "H-1" and "HISHI", the shrinkable temperatures of which were lower.

Example 6

Change in the Thermally-Shrinkable-Tube Shrinkage-Rate

Figure 11:
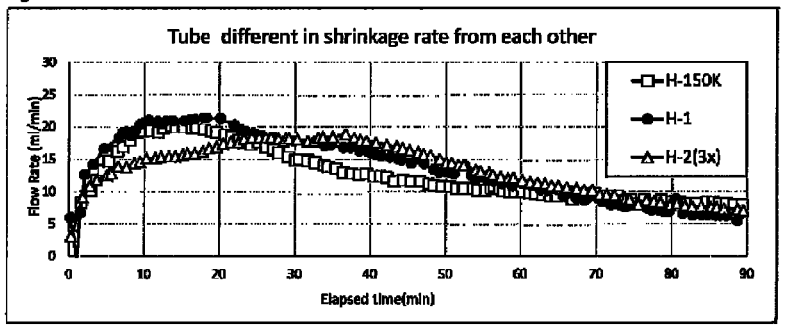
FIG. 11 is a graph showing each change in the hydrogen-generating rate (instantaneous flow rate) in Example 6 with the passage of time.

Hydrogen-generating reaction was caused for 1 hour under the same conditions as in Example 4 except that instead of the use of the tube H-1, the shrinkage rate of which was 2/1, the following was used: a thermally shrinkable tube H-2 having a shrinkage rate of 3/1 and having the same raw material and the same inside diameter (manufactured by Eishin International Co., Ltd.; shrinkable temperature: 80 to 100° C., raw material: polyolefin, pre-shrinkage inside diameter: 9.9 mm, post-shrinkage inside diameter: 3 mm (maximum), and thickness: 0.75 mm (minimum)). The results are shown in FIG. 11 together with the results of the tubes H-150K, and H-1.

As shown in this figure when the shrinkage rate was made large, a peak of the hydrogen-generating reaction became broad and the hydrogen-generating rate was kept even at the latter half. However, the total amount of generated hydrogen was not largely changed.

DESCRIPTION OF REFERENCE SIGNS

1 hydrogen-generating agent
2 covering member
2a openings
3 water absorbent
3a contact regions
3b extended region
4 lid bodies

The invention claimed is:
1. A hydrogen-generating agent, comprising an epoxy resin and granular calcium hydride contained in a matrix of the epoxy resin, wherein the epoxy resin is a resin other than any water-soluble resin, the content of the granular calcium hydride being 60% or more by weight.
2. The hydrogen-generating agent according to claim 1, wherein porosity (%) is 5% or less.
3. A method for manufacturing a hydrogen-generating agent, comprising the step of hardening a mixture wherein granular calcium hydride is contained in an unset epoxy resin at a concentration of 60% or more by weight, wherein the epoxy resin is a resin other than any water-soluble resin.
4. The method for manufacturing a hydrogen-generating agent according to claim 3, wherein the step of hardening is performed under pressure.

* * * * *